United States Patent
Estes

(10) Patent No.: US 7,306,273 B2
(45) Date of Patent: Dec. 11, 2007

(54) ROLL-OFF CONTAINER WITH ADJUSTABLE ATTACHMENT APPARATUS

(76) Inventor: Robert L. Estes, 3560 Saddleboro Dr., Uniontown, OH (US) 44685

( * ) Notice: Subject to any disclaimer, the term of this patent is extended or adjusted under 35 U.S.C. 154(b) by 0 days.

(21) Appl. No.: 10/779,902

(22) Filed: Feb. 17, 2004

(65) Prior Publication Data

US 2005/0051545 A1 Mar. 10, 2005

Related U.S. Application Data

(63) Continuation-in-part of application No. 10/654,777, filed on Sep. 4, 2003.

(51) Int. Cl.
*B65D 90/00* (2006.01)
(52) U.S. Cl. .................. 294/68.1; 220/1.5; 414/498
(58) Field of Classification Search ............... 294/68.1; 220/1.5; 414/491, 498, 546, 555; 108/55.1, 108/53.1
See application file for complete search history.

(56) References Cited

U.S. PATENT DOCUMENTS

| 2,812,013 | A | * | 11/1957 | Kreciglowa | 297/359 |
|---|---|---|---|---|---|
| 3,591,121 | A | * | 7/1971 | Parris | 108/55.1 |
| 3,692,330 | A | * | 9/1972 | Kendall | 280/402 |
| 3,841,505 | A | | 10/1974 | Kent | |
| 3,874,497 | A | * | 4/1975 | Carlson | 198/836.3 |
| 3,897,882 | A | | 8/1975 | Budoff | |
| 4,047,755 | A | * | 9/1977 | McDonald et al. | 297/216.11 |
| 4,790,601 | A | * | 12/1988 | Burleigh et al. | 297/484 |
| 4,813,739 | A | * | 3/1989 | Miller | 297/184.12 |
| 4,869,344 | A | * | 9/1989 | Peterson | 182/129 |
| 4,911,318 | A | * | 3/1990 | Bishop | 220/1.5 |
| 4,964,349 | A | * | 10/1990 | Bishop | 108/55.1 |
| 5,240,320 | A | * | 8/1993 | Yerman | 312/351.11 |
| 5,257,844 | A | * | 11/1993 | Patouillard et al. | 294/67.1 |
| 6,125,720 | A | * | 10/2000 | Gohman | 254/131.5 |
| 6,186,731 | B1 | * | 2/2001 | Vickers et al. | 414/519 |
| 6,364,153 | B1 | | 4/2002 | Petzitillo, Jr. et al. | |
| 6,398,302 | B1 | * | 6/2002 | Freedman et al. | 291/250.1 |

FOREIGN PATENT DOCUMENTS

JP 58141943 * 8/1983 ............ 414/498

* cited by examiner

*Primary Examiner*—Peter M. Cuomo
*Assistant Examiner*—Paul T Chin
(74) *Attorney, Agent, or Firm*—Hudak, Shunk & Farine Co. LPA

(57) ABSTRACT

An adjustable attachment apparatus for a container, in particular, a roll-on, roll-off container, for use with a truck equipped to transport the carrier, such as a hoist truck. The container attachment apparatus includes a connector member, more specifically a hook-receiving member which is vertically adjustable in a guide member to a plurality of different heights in relation to a ground surface in order to accommodate trucks having container retrieving hoist mechanisms with a hook or other element of differing minimum heights which manipulates the container through the connector member. In one embodiment, the guide member includes a rail having a slotted track.

20 Claims, 6 Drawing Sheets

ROLL-OFF CONTAINER WITH ADJUSTABLE ATTACHMENT APPARATUS

CROSS REFERENCE

This application is a continuation-in-part of U.S. application Ser. No. 10/654,777, filed Sep. 4, 2003 entitled "Roll-Off Container with Adjustable Member" herein fully incorporated by reference.

FIELD OF THE INVENTION

The present invention relates to an adjustable attachment apparatus for a container, in particular, a roll-on, roll-off container, for use with a truck equipped to transport the carrier, such as a hoist truck. The container attachment apparatus comprises a connector member, more specifically a hook-receiving or hitch member which is vertically adjustable to a plurality of different heights in relation to a ground surface in order to accommodate various trucks having container retrieving hoist mechanisms with a hook or other element of differing minimum heights which manipulate the container through the connector member.

BACKGROUND OF THE INVENTION

Roll-on, roll-off and other containers of many sizes and types are known and are often used in the collection and transportation of numerous materials including waste materials; residential, commercial and industrial refuse or debris; bulk materials; finished products; parts; or components. Generally, a container is transported by a truck to the site where it is to be filled. The container is unloaded by the truck in some cases by tilting the bed and setting the container on the ground with the aid of a container retrieving hoist mechanism. The container is then filled while sitting on the ground, floor, or other surface before being reloaded onto a truck and transported elsewhere to be emptied or the like.

Prior art containers have been designed with standardized fittings that are specific to facilitate transport by a certain size and/or type of transport means, i.e., truck. The container fittings are permanently positioned to be engaged by the hook or other element of a container retrieving hoist mechanism at a defined height. It is a problem that only a specific truck having a container retrieving mechanism with a minimum hook or other element height can matingly engage or retrieve a container with a specific hook-receiving support or connector member height.

U.S. Pat. No. 3,841,505 relates to a self-packing and ejecting roll off container has a top door and two side doors slightly spaced from a first closed end. A concave packing and ejecting blade having a replaceable edge with a downward extending, friction reducing strip is mounted on a frame which is supported on guides spaced upward from the bottom of the sidewalls. The frame and curved blade are homed at the first closed end with the blade near the door openings. The frame and blade are moved by a multiple stage hydraulic cylinder. The container is completed by a power drive tailgate which closes the container and by a seal which extends inward from the tailgate against the open end to tightly seal the container. The base of the container has hooks at opposite longitudinal ends so that the container may be rolled on and rolled off trucks at either end.

U.S. Pat. No. 3,897,882 relates to a reversible roll-off container for use with a truck chassis. The truck chassis has a rearwardly directed frame and means for hoisting and positioning a container thereon. The container has an improved frame engaging means thereon providing for bidirectional loading of the container and automatic securing or holding of the container on the truck during transport or unloading of the container contents.

U.S. Pat. No. 4,848,619 relates to a removable support with a transverse hooking bar for equipping a front panel of a container, having a front panel and an upper panel, to receive a hook of a swinging cross piece bracket, adapted to fit a transportation and handling vehicle, wherein a transverse hooking bar of the movable support receives a handling hook which is connected to the vehicle. The hooking bar is thereby disposed on the front panel, connected to the removable support. The container is locked into place by an eclipsible lock, but at the same time the removable support can be unlocked, allowing access to the front panel of the container. The removable support can pivot about an axis to a horizontal position on the upper panel of the container where it may be locked into place. The support is vertically moveable on the front panel and may be secured at the top or bottom of the panel by means of the eclipsible lock. A swinging door located on the front panel is made accessible by use of the removable support.

U.S. Pat. No. 5,169,194 relates to a container which has a support member which ascends and descends and is provided at back of a container body, a top connecting member which is fixed at front of the container body and can couple and decouple with a carrier, a bottom connecting member which is provided at the front of the container body so as to be able to move and which couples and decouples with the carrier, and transmitting members which transmit the movement of the bottom connecting member to the support member and raise and lower the support member. When this container is loaded on the carrier, it is reportedly possible to synchronize the front and back of the container body so that the container remains level by raising the front of the container by lifting the top connecting member at the front of the container body by means of a member of the carrier, and holding the bottom connecting member at the front of the container fixed with respect to the ground, transferring the motion of the bottom connecting member relative to the container body to the support member at the back of the container by means of the transmitting members, and extending the support member at the back of the container down to raise the back of the container.

The prior art fails to solve the problem of having to monitor the mateability between trucks and containers of various sizes and thus creates an economic burden on container transporters. For example, even though one transport truck may be located in an area where a full container is waiting to be picked up, the truck is not able to mate with or be able to retrieve the container due to differing connection heights, such as when the truck has a minimum hook or other implement height, and the container has hook-receiving support with a vertical height below the truck hook height. In this case, another truck which is mateable with the container has to be sent out, resulting in a waste of time and resources.

SUMMARY OF THE INVENTION

The present invention provides an attachment apparatus for a container which is adjustable in a travel path, particularly in a vertical direction and can be connected to or retrieved by multiple trucks or other means having container retrieving hoist mechanisms with different hook or other attachment element minimum heights. With the container of the present invention, substantially any container-transporting truck equipped to haul roll-on, roll-off containers can be used to transport the same.

The attachment apparatus is connected to a container wall, preferably a vertical end wall or face wall, panel or section. The apparatus includes at least one stationary guide member which is generally arranged in a vertical direction on the container, preferably centrally located between the ends of the front wall of the container. A connector member having a crossbar, pin or other hookable element, is operatively connected to the guide member and is moveable, in one embodiment, in at least a vertical direction in relation to the guide member and thus also with respect to the rest of the container, as well as a ground surface. The apparatus further comprises a fastening mechanism capable of fixedly positioning, i.e., locking, the connector member in relation to the guide member in a plurality of fastening positions.

In one preferred embodiment, the connector member is situated in a channel created by a guide member and is adjustably securable in a plurality of vertical positions within the channel. The connector member preferably includes a support, pin, or hooking bar which receives a hook or other implement of the truck container receiving hoist mechanism.

In a further embodiment, the container attachment apparatus includes guide member side members or rails comprising a slotted track in which the connector member travels and is adjustably securable in a plurality of vertical positions or heights in relation to the guide member, container, or a ground surface. The slotted track is formed in the side rails of the guide member and forms a pathway in which the connector member is moveable in order to be placed at a predetermined height at which a hook or other implement of a hoist truck can be operatively connected thereto to load and transport a container attached to the, attachment apparatus.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
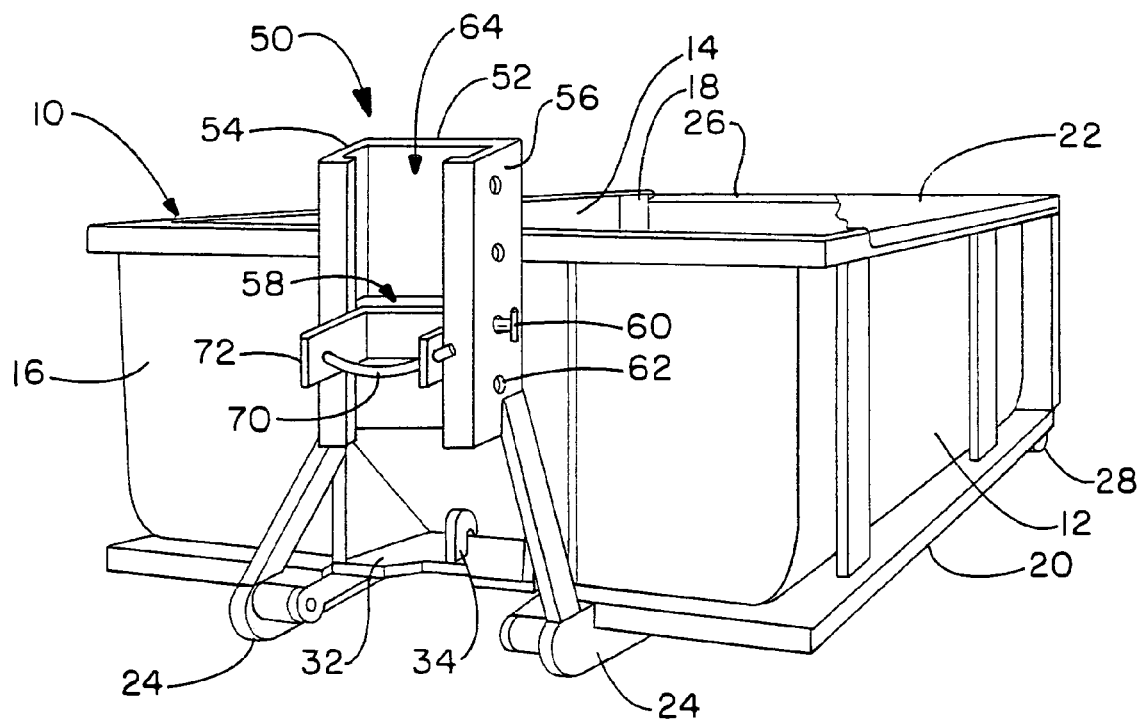
FIG. 1 is a front perspective view of a container having an adjustable attachment apparatus mounted thereto.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Referring now to FIG. 1, there is illustrated in perspective view a container 10 including a -height adjustable attachment apparatus 50 which permits the container 10 to be manipulated and carried or transported by a truck 40 (FIG. 5) or other transport means. Container 10 in one embodiment includes side sections or walls 12, 14, a front section, face or wall 16, a rear section, face, or wall 18, and bottom 20. If desired, the container further comprises a top wall or lid 22 as partially shown in FIG. 1. The container walls are arranged to surround or define a filling area or volume, i.e., an empty space or void which is preferably utilized to store various materials or items, including but not limited to, waste materials including residential, commercial and industrial refuse or debris; bulk materials; finished products; parts; or components.

Figure 5:
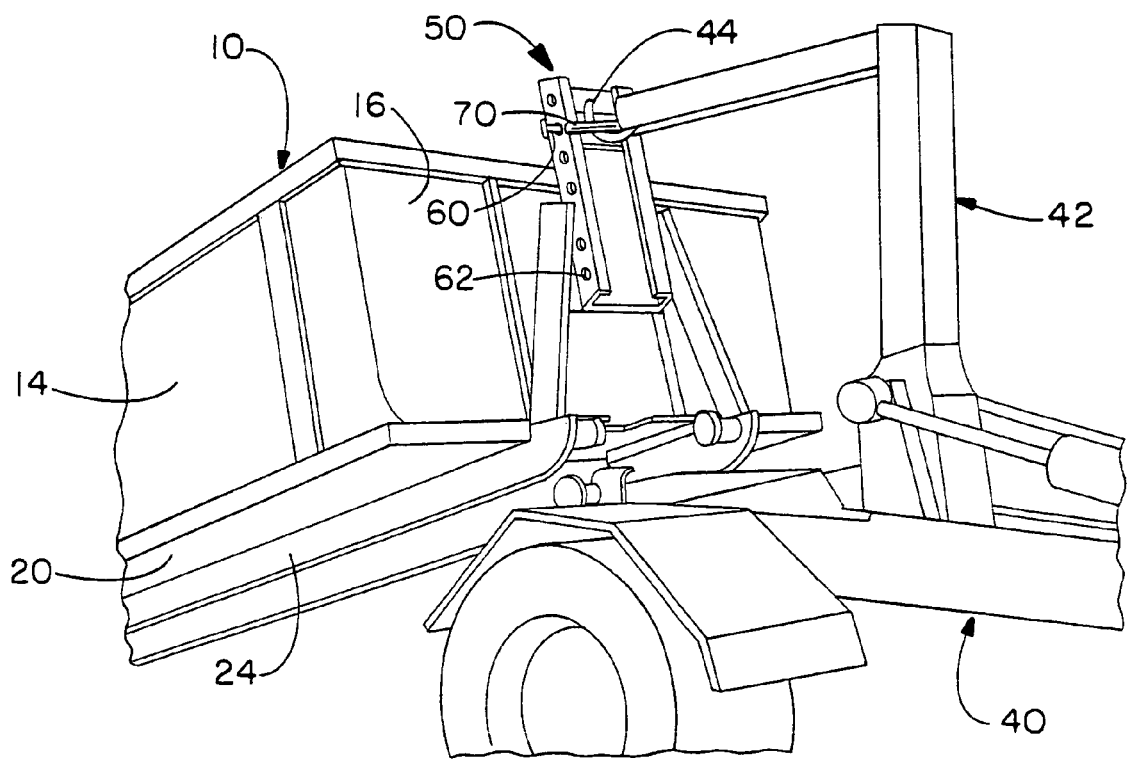
FIG. 5 pictorially illustrates the application of the present invention.

The container 10 is formed from a high strength material such as metal, e.g., steel or other alloy, and generally has a rectangular profile, although other arbitrary shapes, designs and materials are also contemplated. Container 10, optionally including modifications known to the art, in various embodiments and industries, is known as or considered a roll-on, roll-off container, a rear loading dumpster, a compactor receiver box or self-contained unit, recycling container, tank, construction trailer, storage unit, disaster relief trailer, or the like. As shown in FIG. 1, the container includes frame rails 24 connected to bottom 20 which preferably extend substantially the longitudinal length of the container from the front wall 16 to the rear wall 18. The frame rails 24 are preferably parallel and often spaced a predetermined distance apart, such as about 36 to about 48 inches and preferably about 40 to about 46 inches (measured at the outside edge of the rails). In most embodiments, the frame rails 24 serve to guide the container 10 onto a bed of a truck 40 as shown in FIG. 5. Often a truck includes frame rollers which engage frame rails 24 and reduce friction as the container is moved in relation to the truck.

In yet other embodiments, container 10 includes doors, windows, or other access orifices such as rear door 26 situated in rear wall 18 as shown in FIG. 1 which can aid in unloading and/or observing the contents of the container. In a preferred embodiment, container 10 includes rollers 28 or support blocks or pads, or a combination thereof, which contact the ground when the container is not loaded on a truck. Rollers, wheels or the like help to move the container along the ground when moving, loading, or unloading the same. As is known in the art, the container 10 in one embodiment is equipped with a cable receiving hook 34 which as illustrated in FIG. 1, is located in a recess 32, doghouse, or on other alternative container structure which can be used for loading onto a truck or other transport means with an appropriate cable winch system.

Any other container modifications or embodiments as known to those of ordinary skill in the art can be utilized in combination with the present invention, so long as they do not interfere with the operation thereof. In one embodiment, the container is equipped with a locking wing which mates with a corresponding lock, such as a "C" shaped lock located on the truck frame in a loaded position. More than one lock can be provided on a truck or container to accommodate different containers, truck frame lengths, or the like.

A vertically adjustable container attachment apparatus 50 is illustrated in FIG. 1 connected to the front wall 16 of the container. In a further embodiment, one or more adjustable attachment apparatuses 50 are attached to a back or other wall(s) in addition to or in place of the apparatus 50 attached on the front wall 16 of container 10. A portion of the attachment apparatus 50 is preferably welded, bolted or otherwise securely fastened to the front wall 16 of the container 10, or even formed as an integral part thereof.

Figure 2:
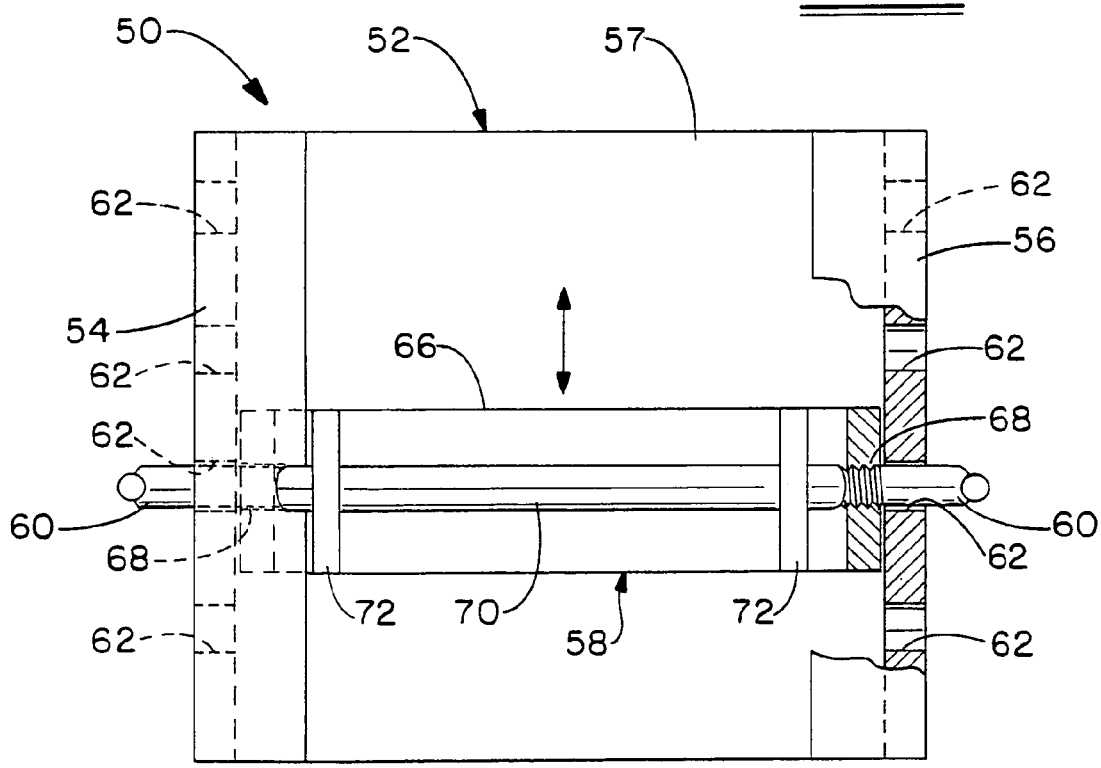
FIG. 2 is a front elevational view of the adjustable attachment apparatus shown in FIG. 1.
Figure 2A:
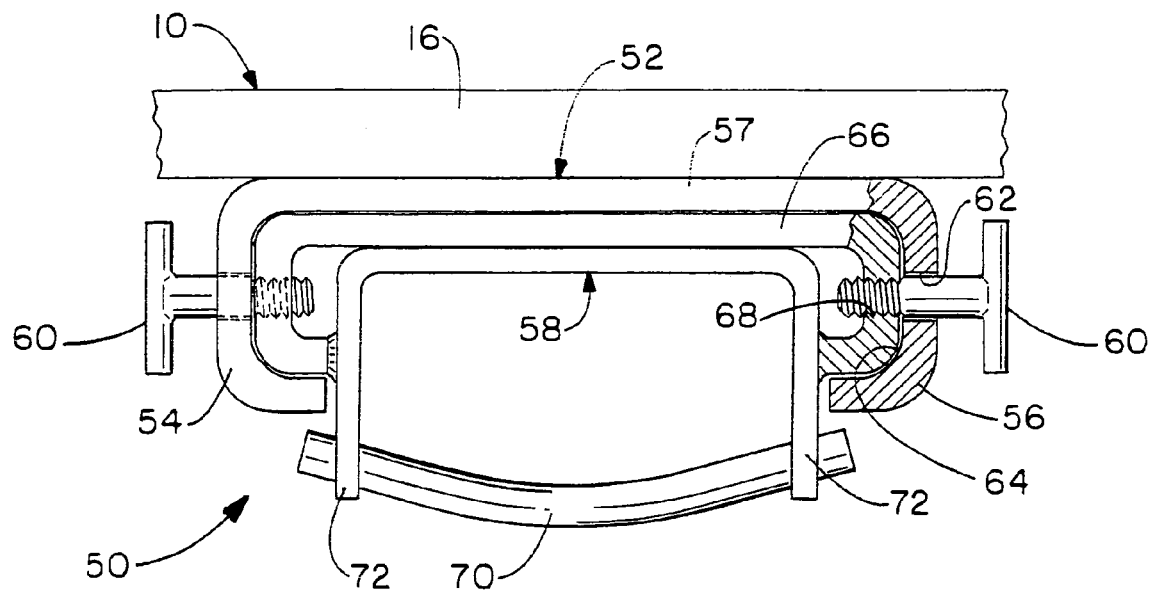
FIG. 2A is a top view of FIG. 2.

In a preferred embodiment as shown in FIGS. 2 and 2A, attachment apparatus 50 includes a guide member 52 preferably directly connected to wall 16 of container 10. The guide member defines a travel path for the height adjustable connector member 158. Guide member 52 is preferably oriented in a vertical direction, i.e., up and down, along the central portion of the wall 16 as shown in FIG. 1. The guide member 52 extends a predetermined distance or length along wall 16 of the container to provide for the desired travel length or path of connector member 58. In one embodiment, the guide member 52 extends above the top boundary or edge of the wall 16 of the container to provide for increased travel distance. The extended guide member 52 is typically utilized in conjunction with containers having relatively short vertical heights.

The guide member 52 in FIGS. 2 and 2A comprises guide rails 54 and 56, preferably situated parallel to each other at a predetermined distance generally from about 4 to about 36 inches, desirably from about 6 to about 24, and preferably from about 12 to about 18 inches. The guide member rails are preferably situated at least at a distance where a portion of the jib apparatus of the truck has clearance or otherwise fits therebetween in a loaded position. The connector member 58 travels in or along the guide rails and is adjustably fastened thereto as described herein. The guide member 52 in one embodiment includes a plurality of fastening apertures 62, preferably located on guide rails 54, 56, which are vertically spaced at predetermined locations and intervals generally from about 1 to about 36 inches, desirably from about 2 to about 30 inches, and preferably from about 4 to about 16 inches. In one preferred embodiment, at least four fastening apertures are located on the guide member at a height above the ground to allow the crossbar 70 to be situated at a height of at about 32 inches, about 36 inches, about 54 inches, about 62 inches, which are also industry preferred truck hook minimum heights. Thus, generally any hook truck can manipulate the container. In one embodiment, the guide rail preferably includes or forms a channel 64 in which connector member 158 can slide or ride during adjustment. The guide rails are connected by back member 57, in some embodiments, which is welded or otherwise fastened to container wall 16.

The vertically adjustable container attachment apparatus 50 comprises connector member 58 which is operatively connected to the guide member 50. The connector member 58, as shown in FIG. 2, is movable in relation to the guide member 52 and can travel or slide along the path defined thereby-and in addition is locked in relation to the guide member, and thus container 10, at a desired height above a ground surface. Connector member 58 has a structure complementary to the guide member 52 which allows adjustable connection at various positions therebetween. As shown in FIGS. 2 and 2A, connector member body 66 has a generally rectangular structure that is sized to travel and lock within channel 64 of guide member 52. Connector member 58 further includes one or more connector apertures 68 preferably on the ends or face of body 66 for lockable fastening of the connector member 58 to guide member 52. When more than one connector aperture 68 or fastening aperture 62 is used per side, they can be arranged in a straight line, staggered, in an arc, or the like, and preferably substantially vertical. Apertures 62 and 68 of the guide member 52 and connector member 58 respectively, are co-alignable in various vertical positions and can be fixed in relation to each other by a fastening mechanism 60. In one embodiment, the apertures 62 and 68 can contain threads.

The connector member 58 includes a crossbar, pin, or hook receiving member or element 70 which is connected to connector body 66 through crossbar support 72. As discussed herein, the crossbar member 70 receives or otherwise operatively connects to a hook, implement or other member 44 of a hoist mechanism of a truck 40 or other vehicle which manipulates the container and preferably loads and unloads the same from the truck. The crossbar member 70 is generally a linear or curved piece of metal capable of being grasped or attached by the hook 44 or other implement of the truck. Desirably the crossbar member 70 is disposed a predetermined distance away from the container wall 16 and guide member 52 as shown in FIG. 2A to provide clearance for attachment of the hook, etc.

A fastening member or mechanism 60 is utilized to fixedly connect connector member 58 to guide member 52 as shown in FIGS. 2 and 2A and prevent movement therebetween. A spring pin provides a fixed connection by extending through both fastening aperture 62 and connector aperture 68 thereby locking the connector member at a fixed vertical height. Any suitable fastening mechanism known to those of ordinary skill in the art and in the literature can be utilized in various embodiments. Examples of fastening mechanisms include, but are not limited to, various fasteners such as spring pins and cotter pins, nuts and bolts, cables and the like. At least one fastening mechanism is utilized. In one embodiment shown in FIGS. 2 and 2A, two, i.e., more than one, fastening mechanisms are utilized, one on each side of connector body 66.

In use, the connector member 58 is moved in relation to guide member 52, such as vertically in channel 64 until a desired hooking height is achieved. That is, the crossbar support 70 is situated at a desired height where a hook or other implement of a hoist truck can connect with the crossbar support. The connector member 58 is locked in relation to guide member 52 utilizing fastening member 60, which as shown in FIGS. 2 and 2A extends through co-aligned noted apertures 62, 68. In order to change the vertical height of the connector member 58, especially the crossbar support 70 thereof, the fastening member is removed or otherwise backed out of at least one of the apertures so that the connector member 58 is movable in relation to guide member 52.

While connector member 58 can be manually adjusted, it can also be moved in any manner such as by a crank attached to an elevating or lowering screw, i.e. a helix, or as by an elevating or lowering ratchet mechanism.

Figure 3A:
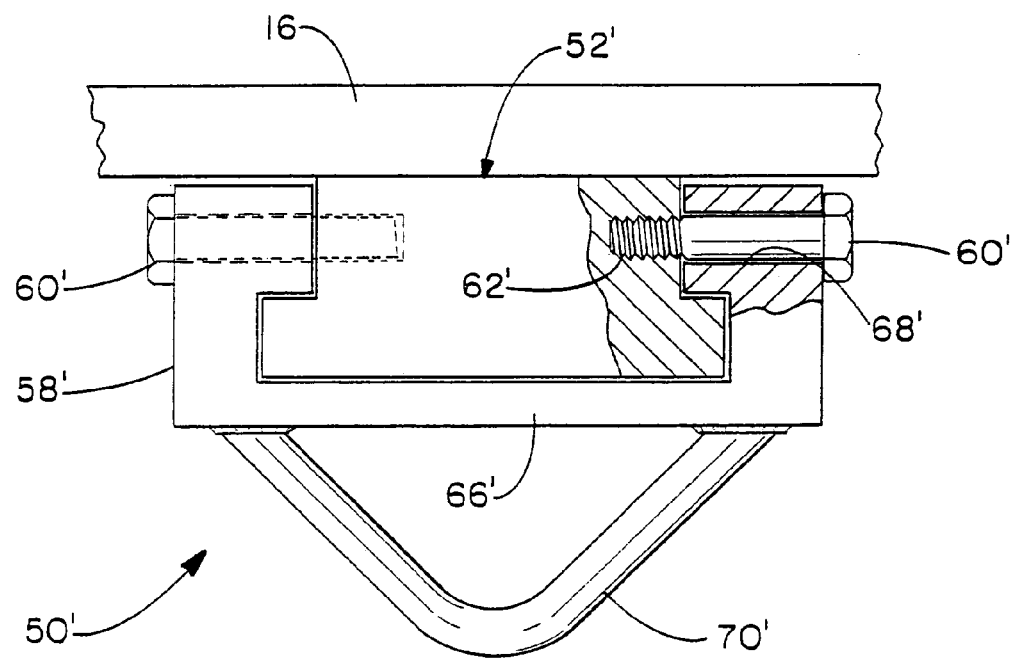
FIG. 3A is a top view of FIG. 3.
Figure 3:
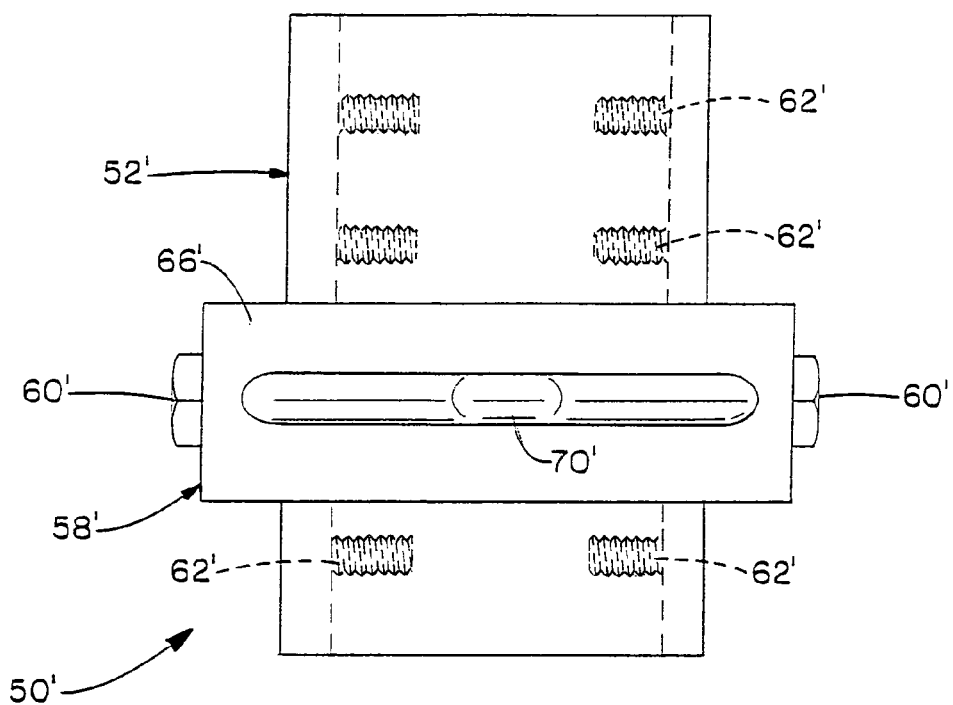
FIG. 3 is a front elevational view of another embodiment for an adjustable attachment apparatus.

FIGS. 3 and 3A show a further embodiment of the vertically adjustable container attachment apparatus 50' of the present invention. FIG. 3 is a front elevational view of the attachment apparatus 50' connected to front wall 16 of container 10. In one embodiment, guide member 52' extends above the top portion of front wall 16 in this embodiment to provide for additional vertical range for crossbar support 70'. Connector member 58' is movable, preferably vertically in relation to guide member 52' to provide crossbar support 70' with predetermined adjustable height settings. Connector member 58' includes body member 66' having crossbar support 70' generally disposed on the front portion thereof, a predetermined distance away from wall 16. Connector member 58' and/or guide member 52' includes one or more apertures 62', 68' for fixedly positioning connector member 58' in relation to guide member 52' at a predetermined height. A suitable fastening member 60' as noted hereinabove is utilized to fasten the members together and can be removed or moved to an unlocked position in order to adjust the height of the connector member 58', especially the crossbar support 70' thereof as disclosed herein. As is known in the art, friction reducing linings, wheels, or the like can be utilized in various embodiments to aid movement between the guide member and the connector member.

FIG. 5 is a partial perspective view of a truck 40 having a hoist system 42 in position to load a container of the present invention including a height adjustable container attachment apparatus. Trucks having hoist systems including a hook 44 or other implement are well known to those of ordinary skill in the art. Hoist trucks typically include an elongated frame situated behind a driver cab. The hoist system 42 is generally connected to the main frame and operatively controlled through an appropriate drive control between a hookup position and a loaded position. As detailed hereinabove, in the container loading position, the hook or other implement 44 of the hoist system has a minimum hook height, i.e., a height above a ground surface below which the hook or other implement of the hoist cannot be lowered. Such hoist systems are well known in the art and available from companies such as Marrel Corporation of Hendersonville, Tenn.

One method of utilizing the present invention is described. In order to load a container onto a hoist truck 40 or other transport means, a driver generally backs up the truck to the container. Utilizing controls, preferably within the cab of the truck, the hoist arm including a hook or other implement 44 capable of retrieving a container generally situated on the end thereof is manipulated and generally extended backwards beyond the rear frame of the truck. It is the goal of the driver to guide the hook directly under the crossbar, pin, or hook receiving element 70 to allow lifting of the container. When the hoist arm is extended so that the truck hook or implement is at a minimum height and the hook receiving support of the container is below the minimum hook height, the adjustable container attachment apparatus 50 must be adjusted. Accordingly, the fastening mechanism 60 of the attachment apparatus 50 is unfastened and the connector member 58 is moved within guide member 52 in an upward manner until the crossbar element 70 has been raised above the minimum hook or implement height of the hoist truck 40. Likewise, it is to be understood that the connector member in some embodiments and/or methods is lowered or moved in a downward manner if necessary to connect the crossbar element 70 to a hoist having an implement with a relatively low minimum hook or implement height. The crossbar element height can accordingly be matched to the minimum hook height of the truck hoist. Afterwards, the fastening mechanism 60 is utilized to fixedly lock connector member 58 to guide member 52 of the container attachment apparatus 50. More specifically, in one embodiment the fastening mechanism is inserted through fastening apertures 62 of guide member 52 as well as through connector apertures 68 of connector member 58 thereby preventing movement between the guide member and connector member of the attachment apparatus. The hook or other implement 44 is then guided underneath the crossbar, pin, or hook receiving element 70 then, the hoist arm is manipulated by the user and the front end of container 10 is lifted towards and onto the truck frame. The hoist arm is further moved to a loaded position and container is thus drawn onto the back of the truck, on the frame thereof. Additional locking mechanisms as known in the art can be utilized to further secure container 10 on truck 40.

As known in the art, various trucks or other transport vehicles include a hook, jib assembly, arm or other implement 42 capable of grasping a crossbar support on a container in order to load the container onto the truck 40. In order to load the truck, the hook is extended a predetermined distance behind the truck in a container grasping position. In this extended position, the hook or other implement 44 has a known minimum height below which the same cannot be lowered, i.e., a minimum hook height. As is known in the art, minimum hook heights vary depending on the size of the truck and individual hook hoists attachment manufacturers. Examples of various hook heights commonly utilized in the industry include, but are not limited to, about 32 inches, about 36 inches, about 54 inches and about 62 inches.

Figure 4:
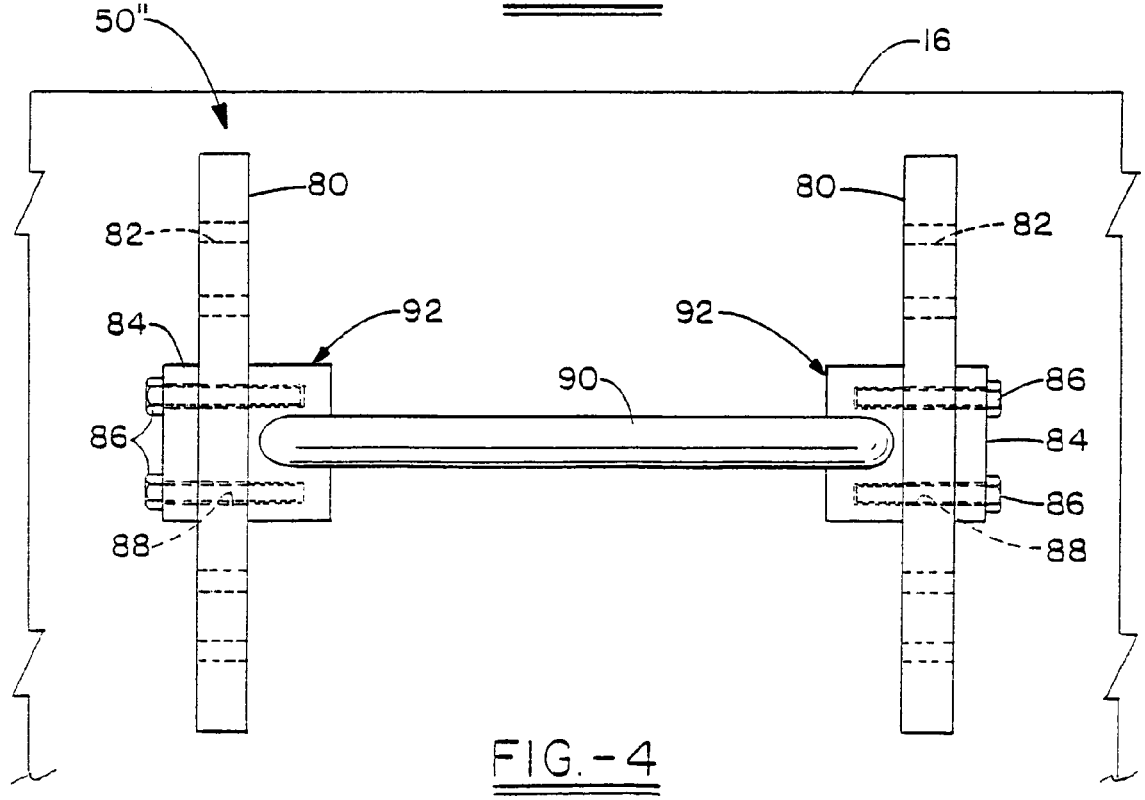
FIG. 4 is a front elevational view of still another embodiment for an adjustable attachment apparatus.
Figure 4A:
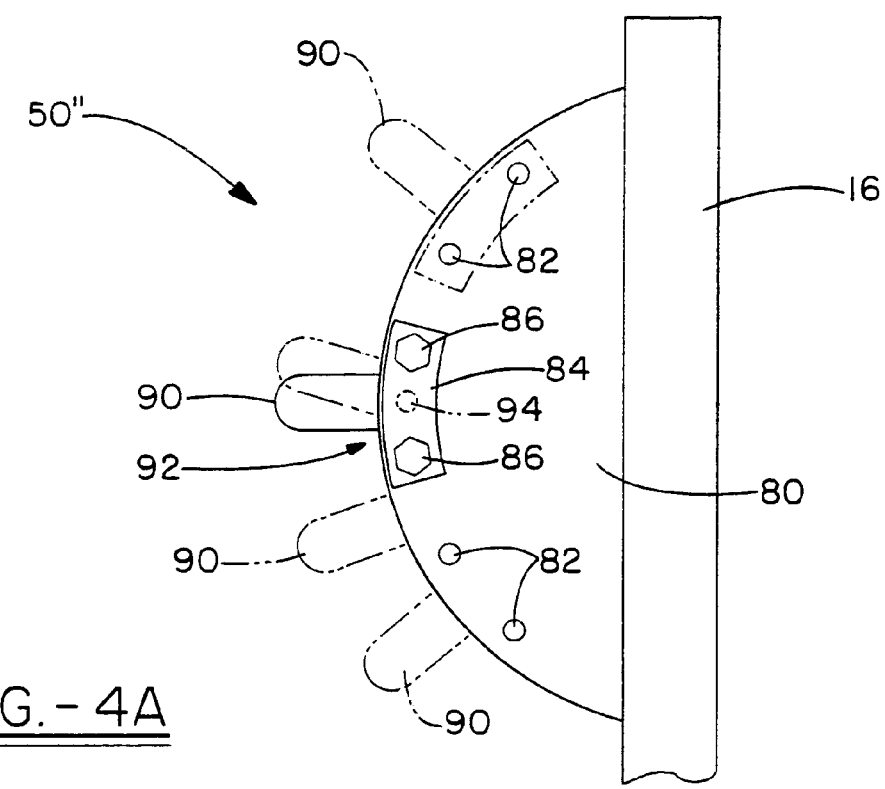
FIG. 4A is a side elevational view of the apparatus shown in FIG. 4.

In a further embodiment as shown in FIGS. 4 and 4A, the height adjustable container attachment apparatus 50" includes guide member 80 having guide rails which are curved or arched. Accordingly, apertures 82 are also located on guide member 80 in an overall pattern of an arc or curve. Connector member 92 travels along the archial guide member 80 and is again fixedly connected thereto through body 84 by a suitable fastening mechanism 86 through apertures 88. Also illustrated in FIG. 4 is an adjustable crossbar support 90. In this embodiment, the crossbar support can be adjusted to a plurality of positions, some of which are illustrated in FIG. 4. The crossbar support can be adjusted to provide for additional hooking or attachment possibilities. The crossbar support 90 can be locked in place utilizing a suitable fastener as described herein or a cam lock or other locking mechanism 92 known to those of ordinary skill in the art.

Figure 6:
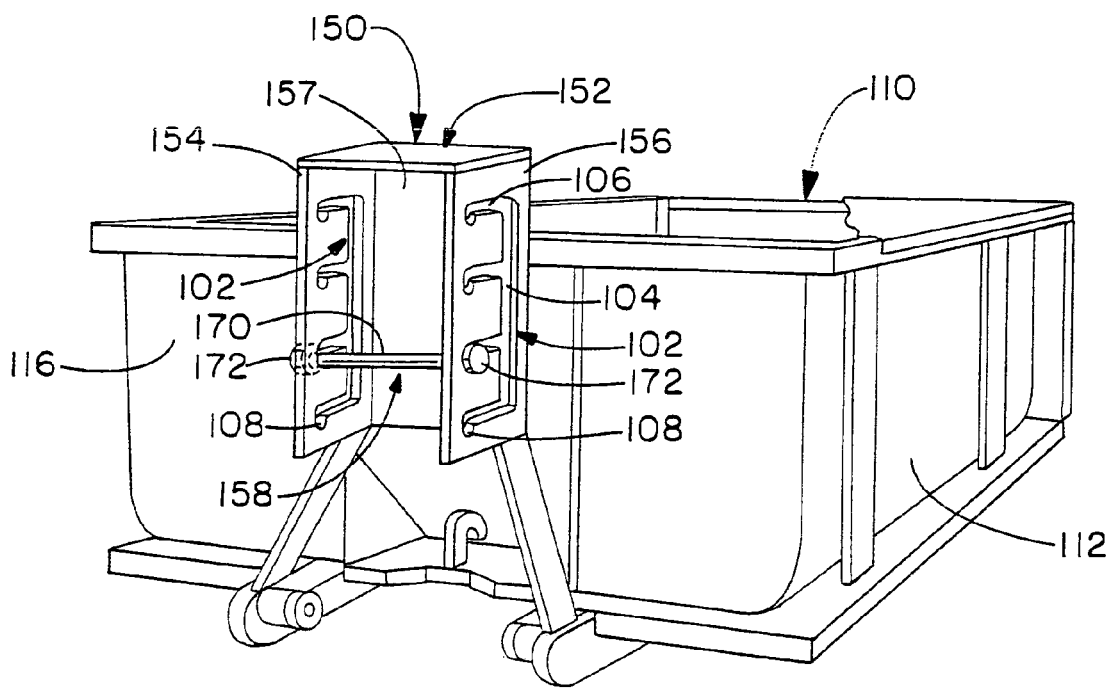
FIG. 6 is a partial perspective view of a further embodiment of a container attachment apparatus connected to a container wherein the guide member includes a slotted track.

In a further embodiment, the container attachment apparatus has a configuration which allows for relatively simple adjustment of the connector member in relation to the guide member and container without the use of tools, if desired. As illustrated in FIG. 6, the apparatus 150 includes a guide member 152 with two or more, preferably two, guide member rails or side members 154, 156 having a slotted track 102 which extends out or away from a surface of the container or other object to which the apparatus is connected. Guide member 152 is attached to a front wall 116 of container 110 through guide rails 154 and 156, or optionally are connected via back plate 157 in some embodiments to the container surface. As stated hereinabove, in one embodiment the guide rails 154, 156 are disposed or situated parallel to each other at a predetermined distance of generally from about 4 to about 36 inches, desirably from about 6 to about 24 inches, and preferably from about 12 to about 18 inches.

Figure 10:
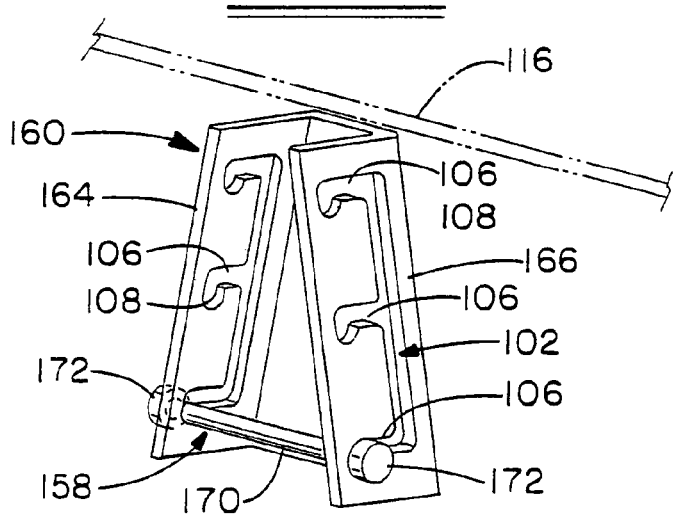
FIG. 10 is a perspective view of an attachment apparatus comprising guide member rails which are disposed at an angle with respect to vertical.

In an alternative embodiment as shown in FIG. 10, the attachment apparatus 160 guide member 162 has rails 164, 166 which are each disposed at an angle with respect to vertical and to each other. If desired, each guide rail can be oriented at an angle with respect to vertical generally of from about 1 to about 60 degrees, desirably from about 1 to about 45 degrees, and preferably from 1 to about 25 degrees. The angled guide rails 164, 166 are utilized in situations where it is impractical or not desired to utilize substantially parallel rails attached to a container or other object.

The guide rails 154, 156, 164, 166 include at least one aperture, more specifically a slotted track 102 in which a connector member 158 is moveable to a plurality of different height positions, preferably vertical heights with respect to the upper and lower ends of the apparatus. The track 102 is dimensioned to have a width, which is greater than the diameter or width of the connector member 158 in order to allow one portion of the member to freely travel thereon without binding or hanging up.

Figure 9A:
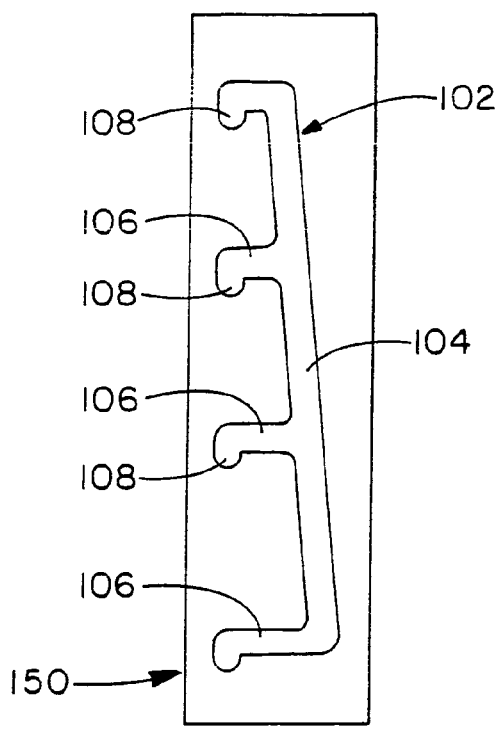
FIGS. 9A and 9B illustrate side views of an attachment apparatus comprising guide member rails having slotted tracks of various configurations.
Figure 9B:
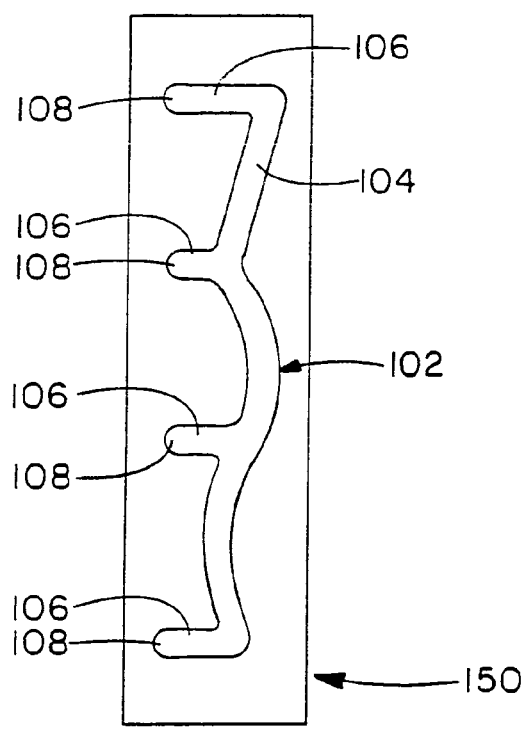

Track 102 includes a height adjustment slot 104 which is preferably oriented in a vertical direction to allow rapid, convenient vertical adjustment of the connector member 158. It is to be understood that the height adjustment slot 104 can have alternative shapes or configurations in all or only a portion of the slot length, including but not limited to, a curved portion, an angled portion, or the like, or combinations thereof as shown in FIGS. 9A and 9B. For example in one embodiment, the track height adjustment slot 104 is angled in a range from about 1° to about 45° with respect to vertical, see FIG. 9.

Figure 7:
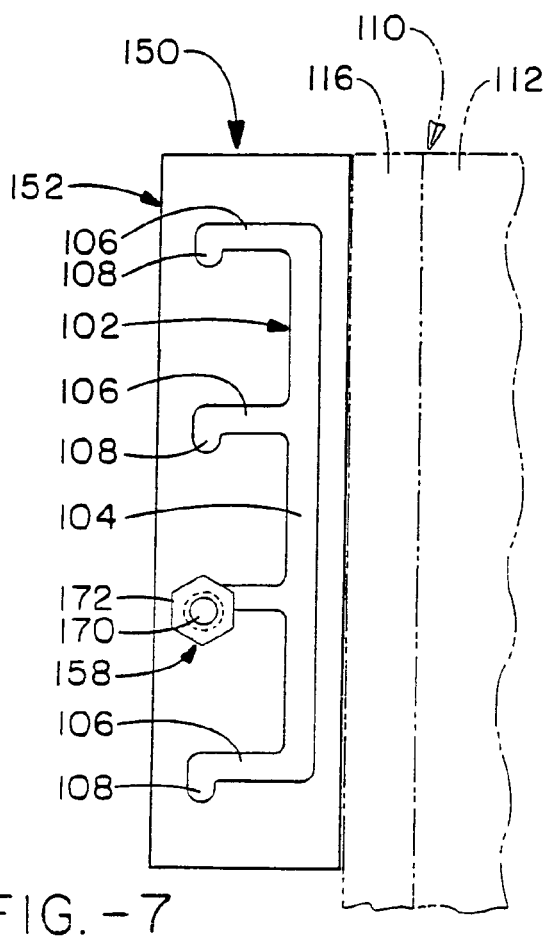
FIG. 7 is a partial side view of FIG. 6.
Figure 8:
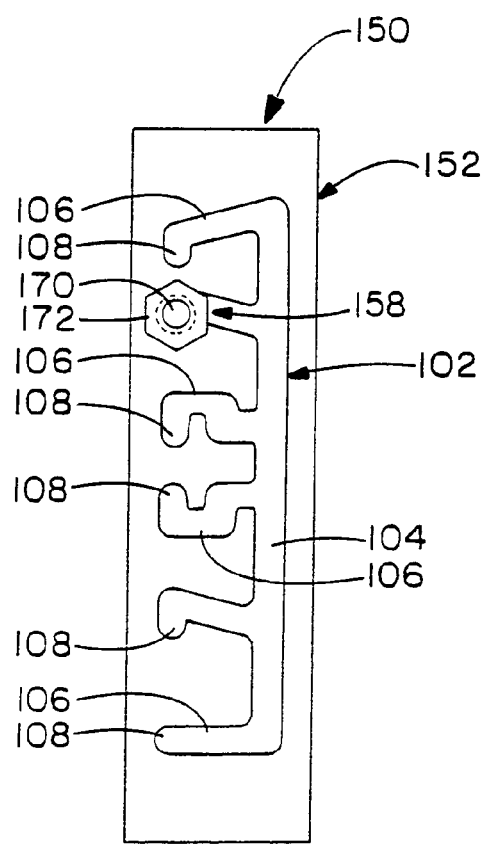
FIG. 8 is a side view of an attachment apparatus comprising a guide member rail with a slotted track having a plurality of different slot configurations.

The guide rail track 102 also includes at least one arm slot 106 extending a predetermined distance from the height adjustment slot 104, generally in a forward direction away from back plate 157 and container as shown in at least FIGS. 6 and 7. In one embodiment, the transition between the height adjustment slot and arm slot is relatively smooth, i.e., such as a curve or arc, and not abrupt such as a 90° angle. The arm slot 106 and end portion 108 is adapted to house the connector member 158 at a predetermined height above a ground surface and also with respect to a longitudinal direction of the guide rails, where a portion of the hook truck jib apparatus such as a hook or other implement can operatively be attached to the connector member 158 of the apparatus 150 and thus move the container. The arm slot 106 can have various configurations as illustrated in FIG. 8, and including, but not limited to, an angled portion, a detent portion, an arched portion, or a curved portion in order to house or receive the connector member 158, and maintain the connector member 158 at a predetermined height.

The arm slot 106 can have a portion thereof which is located or dispersed at an angle of about 1° to about 60° with respect to horizontal. Substantially horizontally oriented arm slots are illustrated in FIG. 6 and can be considered a comb configuration. The number of arm slots per guide member rail ranges from 1 to about 12 or about 25, desirably from 1 to about 6 or about 8, and preferably 1 to about 4. In one embodiment, the end portion 108 of the arm slots has a detent as shown in FIG. 7, which allows the connector member to rest in place therein.

The arm slot configuration maintains the connector member a predetermined horizontal distance away from the container wall 112 or back plate 157, such as about 2 to about 12, and preferably from about 5 to about 7 inches, so that a hook or other implement has enough clearance to be operatively attached to the attachment apparatus 150 as described herein. If desired, one, two or three arm slots 106 may be utilized in various embodiments, such as when the height adjustment slot 104 is angled or otherwise shaped to maintain or house the connector member 158 at a predetermined distance from the front 107 or rear 109 end of the rail member 56, similar to FIG. 9A.

The connector member 158 is operatively contained in any guide member rail segments 106 present as shown in at least FIG. 6 and is moveable within the travel path of the slotted track 102. As illustrated in FIGS. 6 and 7, the connector member 158 extends between rails 154 and 156 and through each slotted track 102. Connector member 158 has a structure complementary to the slotted track at the location where the member is in physical contact therewith, i.e., where the member extends through the thickness of the side member, such as at location 119, from the inner side 117 to the outer side 118.

The guide rails 154 and 156 or 164 and 166 are preferably arranged in a manner so that the slotted tracks of each rail are aligned, as shown in FIG. 7 to allow for efficient movement of the connector member 158 and thus prevents substantial binding of the apparatus between the guide member rails and connector member.

The connector member 158 includes a crossbar, pin, or hook receiving member 170, of which portions thereof extend through the slotted tracks of any guide member rails present. The connector member 158 also includes end elements or stops 172 which prevent removal or displacement of the connector member 158 from the apparatus.

In one embodiment, the crossbar member 170 has a threaded end and the end stop 172 is a nut or other securing element threadable on the crossbar member 170 in order to allow for installation and removal of the connector member from the guide rails.

Figure 11A:
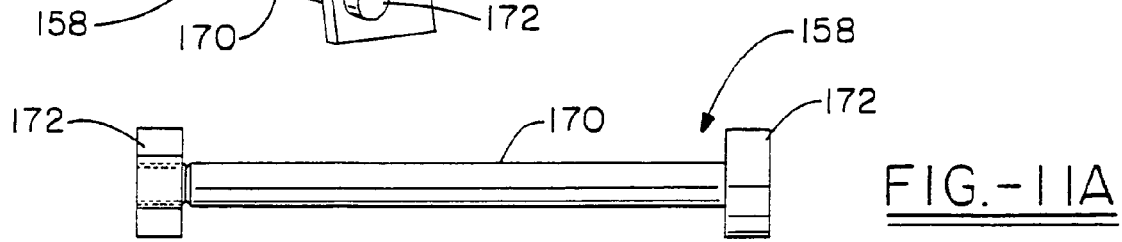
FIGS. 11A and 11B illustrate front elevational views of connector members having various configurations.
Figure 11B:
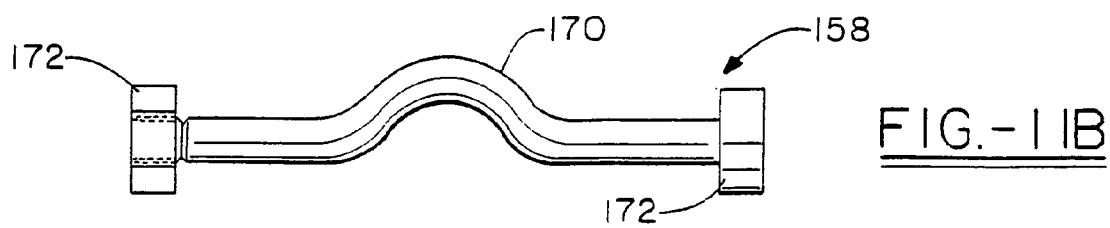

In a preferred embodiment, the end element or stop 172 has a diameter which is greater than the width or diameter of the slotted track 102 in order to prevent removal of the connector member 158 from the guide rails. As disclosed hereinabove, the crossbar member, 170 can have any shape and is generally a linear piece of metal, see FIG. 11A or curved piece of metal, see FIG. 11B, capable of being grasped or attached by the hook or other implement of a hoist truck or manual lift. In a preferred embodiment, the cross member is a tubular, cylindrical bar, and most preferably a solid metal bar formed from about one to about three inch round stock, with two inch round stock being highly preferred.

In one embodiment, the guide member 152 is formed as follows. A sheet of metal, preferably planar, having a thickness from generally about 0.25 inch to about 3 inches, desirably from about 0.3 inch to about 2 inch, and preferably from about 0.4 to about 1.50 or about 1 inch is utilized. Generally, the structure of the apparatus, i.e., thickness, depends on the container dimensions or weight, end use, etc. The sheet of metal of a predetermined size is folded at the end portions thereof to form the guide rails 156 of a predetermined depth and height. The guide rails are disposed at an angle generally from about 60° to about 120°, desirably from about 80° to about 100°, and preferably about 90° with respect to the remaining non-folded portion of the sheet, i.e., back plate 157, and also a container wall when the guide member is attached thereto. In some instances, a back member is not present, and the guide member rails, optionally having an "L" or "T" shaped base, are individually welded to the container. Either before or after the guide rails are formed, the slotted track 102 is formed in a guide rail of the guide member 50. Examples of slotted track forming methods include, but are not limited to, laser cutting, machining, water cutting, stamping, or the like. After the slotted tracks are formed in the guide rails, a crossbar member 170 is inserted through each guide rail present and end element 172 is connected to each end. Obviously, an end element 172 can be attached to one end of the crossbar member 170 before being inserted through the apparatus guide rails before a second end element is attached to the opposite end.

The apparatus of the present invention including the guide members with slotted tracks is utilized as follows. The connector member 158 is moved within the slotted track 102 vertically, horizontally, or otherwise and placed into an arm slot 106 or other location within the track of desirable height wherein a hook, jib assembly, arm or other implement is capable of grasping the crossbar support element and thus loading the container to which the apparatus is attached onto a hoist truck or other vehicle. The connector member of the present invention is fixedly adjustable within the slotted track of the guide rail at at least two different heights are described herein and desirably from about 2 to about 10 different heights and preferably from about 2 to about 4 or about 5 different heights, measured in respect to the height or longitudinal direction of the guide member or a ground surface.

Heretofore, a specific truck could only pick up a container having a crossbar support height at or above the minimum hook height of the truck. With the present invention container including the multiple height adjustable container attachment apparatus, crossbar element height can be modified to allow a container to be picked up by many different sizes and/or types of trucks or other transport vehicles. In a preferred embodiment, the height adjustable container attachment apparatus is adjustable and has a crossbar or hook receiving support element height of generally about 12 to about 84 inches, desirably about 24 to about 72 inches and preferably from about 28 to about 70 inches. In a further embodiment, the crossbar 70, 170 is fixedly adjustable at heights of about 32 inches, about 36 inches, about 54 inches, and about 62 inches. In yet a further embodiment, the height adjustable container attachment apparatus is adjustable to have crossbar heights which vary incrementally by about ½ or about 1 inch to about 12 inches, and desirably from about 4 to about 8 inches. One aperture can have different spacings between adjacent apertures; i.e. uneven spacing.

In accordance with the patent statutes, the best mode and preferred embodiment have been set forth; the scope of the invention is not limited thereto, but rather by the scope of the attached claims.

What is claimed is:

1. An attachment apparatus for a container, comprising: a guide member having at least two guide rails disposed a distance from each other, said guide member having a front edge, and a rear edge adapted to be connected to the container, said container adapted to include an area adapted to hold materials comprising waste materials, debris, bulk materials, finished products, parts, or components and be transported by a transport vehicle utilizing the attachment apparatus, said guide rails each having a slotted track having a comb configuration, said slotted track having a height adjustment slot having a slot length and at least two arm slots connected to and extending outwardly a predetermined distance away from the height adjustment slot and away from the rear edge of the guide member; and a connector member operatively connected to and movable in the slotted track of each said at least two guide rails, the connector member extending between the at least two guide rails and through the slotted track in the at least two guide rails, the connector member having an end element connected to each end of the connector member at a location outside of the at least two guide rails to prevent selective removal of the connector member from the guide member, wherein each arm slot is connected to the height adjustment slot so that the connector member is movable between the height adjustment slot and each arm slot, wherein each arm slot terminates at an end portion within the guide rail toward a front edge of the guide member, and wherein the connector member is adapted to be engaged by a hook or attachment element of a container retrieving hoist mechanism of the transport vehicle at the end portion of the arm slot located toward the front edge of the guide member and away from the rear edge of the guide member so that the attachment apparatus can be moved.

2. An apparatus according to claim 1, wherein with respect to a longitudinal direction, the guide rails are substantially parallel or each disposed at an angle of about 1° to about 45° with respect to vertical with upper ends of the guide rails being closer together than lower ends of the guide rails.

3. An apparatus according to claim 2, wherein each guide rail has a thickness of from about 0.25 to about 3 inches.

4. An apparatus according to claim 1, wherein the slotted track has about 2 to about 12 arm slots, and wherein at least one arm slot terminates at the end portion which is located a distance of about 2 to about 12 inches from the rear edge of the guide rail.

5. An apparatus according to claim 4, wherein the guide rails have front edges are spaced an average distance of about 4 to about 36 inches, and wherein 2 to about 8 arm slots are present.

6. An apparatus according to claim 5, wherein the guide rail thickness is about 0.3 to about 2 inches, and wherein the guide rails are connected to a back plate that is adapted to be connected to the container.

7. An apparatus according to claim 6, wherein the guide rails are substantially parallel to each other.

8. An apparatus according to claim 6, wherein a front wall of a container is connected to the guide member rear edge of the attachment apparatus, wherein the container further includes two side walls connected to the front wall and a rear wall connected to the side walls, the walls defining a filling area, wherein the container is a roll-on, roll-off container; a rear loading dumpster; a compactor receiver box; self contained unit; recycling container; a tank, a trailer, a storage unit or a disaster relief or construction trailer and wherein the height adjustment slot is located between the at least two arm adjustment slots and the front wall of the container.

9. An apparatus according to claim 6, wherein at least one end element is removable from the connector member.

10. An apparatus according to claim 1, wherein a front wall of a container is connected to the guide member rear edge of the attachment apparatus, wherein the container further includes two side walls connected to the front wall and a rear wall connected to the side walls, the walls defining a filling area, wherein the container is a roll-on, roll-off container; a rear loading dumpster; a compactor receiver box; self contained unit; recycling container; a tank, a trailer, a storage unit or a disaster relief or construction trailer and wherein the height adjustment slot is located between the at least two arm adjustment slots and the front wall of the container.

11. A transportable container having a height adjustable attachment apparatus, comprising:
    a container body comprising a base, two side walls, a rear wall, and a front, upright section attached to said base, said container defining a volume adapted to hold materials and be transported by a transport vehicle utilizing the attachment apparatus; the attachment apparatus comprising:
    a guide member having at least two guide rails, said guide member attached to said container front upright section; and
    a connector member operatively connected to and moveable in a slotted track having a comb configuration in each of said guide rails, wherein said slotted track has a height adjustment slot and at least two arm slots located further away from the container front and the base than the height adjustment slot and extending a predetermined distance away from the height adjustment slot toward a front edge of the guide member and away from the container wherein the connector member includes portions which extend through the slotted track in each guide rail and end elements which prevent removal of the connector member from the slotted tracks and wherein each arm slot is connected to the height adjustment slot so that the connector member is movable between the height adjustment slot and each arm slot, wherein the connector member extends between the at least two guide rails, wherein each arm slot terminates in an end portion within the guide rail toward the front edge of the guide rail, and wherein the connector member is adapted to be engaged by a hook or attachment element of a container retrieving hoist mechanism of the transport vehicle at the end portion of the arm slot located toward a front edge of the guide member and away from a rear edge of the guide member so that the attachment apparatus and container connected thereto can be moved.

12. A container according to claim 11, wherein the connector member extends through the slotted track in each guide rail present, and wherein with respect to a longitudinal direction, the guide rails are substantially parallel or each disposed at an angle of about 1° to about 45° with respect to vertical with upper ends of the guide rails being closer together than lower ends of the guide rails.

13. A container according to claim 12, wherein the slotted track has 2 to about 12 arm slots, wherein each guide rail has a thickness of from about 0.25 to about 3 inches, and wherein the container is a roll-on, roll-off container; a rear loading dumpster; a compactor receiver box; self contained unit; recycling container; a tank a trailer, a storage unit or a disaster relief or construction trailer.

14. A container according to claim 13, wherein the guide rails are substantially parallel to each other, and wherein the guide rails are connected to a back plate wherein the back plate is connected to the container front upright section.

15. A container adjustable attachment apparatus, comprising:
    a guide member having at least two side members disposed a distance from each other and capable of being attached to a container, said guide member having a front edge and a rear edge adapted to be connected to the container, said container adapted to include an area adapted to hold materials comprising waste materials, debris, bulk materials, finished products, parts, or components and be transported by a transport vehicle utilizing the attachment apparatus;
    a back plate capable of being attached to the container and said side members being attached to said back plate by their rear edges;
    each said side member having a slotted track therein having a comb configuration comprising at least a substantially vertical adjustment slot and at least two arm slots connected to and extending outwardly a predetermined distance away from the substantially vertical adjustment slot in a substantially horizontal direction toward the front edge of the guide member and away from the container and away from the back member;
    each said side member slotted track having a said vertical adjustment slot and said horizontal slots in substantial alignment with the remaining slotted tracks; and
    a connector member extending between and through the at least two side members said slotted track of at least two said side members and being slidably movable therein, the connector member operatively connected to the guide member by end elements connected at each end of the connector member at a location outside of at least two side members,
    said connector member being capable of receiving an attachment element of the transport vehicle for moving said attachment apparatus, wherein each arm slot is open to the height adjustment slot so that the connector member is movable between the height adjustment slot and the arm slots, and wherein each arm slot terminates in an end portion within the side member toward the front edge of the guide member.

16. An apparatus according to claim 15, wherein the connector member extends through the slotted track in each side member present, wherein with respect to a longitudinal direction, the side members are substantially parallel or each disposed at an angle of about 1° to about 45° with respect to vertical with upper ends of the side members being closer together than lower end of the side members, and wherein the track has 2 to about 12 substantially horizontal slots and wherein at least one horizontal slot terminates at an end portion which is located a distance of about 2 to about 12 inches from a rear edge of the side member.

17. An apparatus according to claim 16, wherein the angle between said back plate and each side member is about 60° to about 120°.

18. An apparatus according to claim 17, wherein about 2 to about 8 substantially horizontal slots are present and wherein the side members are substantially parallel to each other.

19. An apparatus according to claim 18, wherein said guide member back plate is connected to a container comprising a front wall, two side walls connected to the front wall, a rear wall connected to the side walls and a base connected to the walls, wherein the container is a roll-on, roll-off container; a rear loading dumpster; a compactor receiver box; self contained unit; recycling container; a tank, a trailer, a storage unit or a disaster relief or construction trailer and wherein the height adjustment slot is located between the at least two arm adjustment slots and the front wall of the container.

20. An apparatus according to claim 17, wherein at least one end element is removable from the connector member.

* * * * *